US006737148B1

(12) United States Patent
Smith

(10) Patent No.: US 6,737,148 B1
(45) Date of Patent: *May 18, 2004

(54) CAMOUFLAGED PERFORATED PANEL AND METHOD OF FORMING

(75) Inventor: Philip Ray Smith, Marble Falls, TX (US)

(73) Assignee: Walls Across Texas, Inc., Marble Falls, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/560,027

(22) Filed: Apr. 27, 2000

Related U.S. Application Data

(60) Provisional application No. 60/168,657, filed on Dec. 2, 1999.

(51) Int. Cl.[7] .................................................. B32B 3/24

(52) U.S. Cl. ....................... 428/131; 428/195; 428/206; 428/207; 428/137; 428/913.3; 428/919; 248/230.31; 248/220.41; 248/220.42; 248/220.43; D25/152; D25/155

(58) Field of Search ................................ 428/131, 137, 428/195, 206, 207, 913.3, 919; 248/220.31, 220.41, 220.42, 220.43; D25/152, 155

(56) References Cited

U.S. PATENT DOCUMENTS

| | | | | |
|---|---|---|---|---|
| 1,689,302 A | | 10/1928 | Smith | |
| 3,119,729 A | | 1/1964 | Ljungbo | |
| 3,677,415 A | * | 7/1972 | Radek | 248/220.42 |
| 4,285,068 A | | 8/1981 | Ross | 2/202 |
| 4,473,087 A | | 9/1984 | Cavender | 135/87 |
| 4,876,817 A | | 10/1989 | Hill | 43/1 |
| 5,171,040 A | * | 12/1992 | Orndorff | 283/58 |
| D455,221 S | * | 4/2002 | Smith | D25/152 |

FOREIGN PATENT DOCUMENTS

| | | |
|---|---|---|
| SE | 1535260 | 12/1978 |

OTHER PUBLICATIONS

W. Joseph Stell, *Scenery*, Published 1970 by Richards Rosen Press, Inc., Copyright 1970 by W. Joseph Stell, 3 pp.
Willard F. Bellman, "Scene Painting," *Scene Design, Stage Lighting, Sound, Costume & Makeup*, Copyright 1983 by Harper & Row, Publishers, Inc., p. 236.
"Painting," *The Complete Play Production Handbook*, Copyright 1982 by Carl Allensworth, p. 239.
Richard L. Arnold, "Scene Painting," *Scene Technology*, 1985 by Prentice–Hall, Inc., p. 174.
"How it Works," *The Illustrated Encyclopedia of Science and Technology*, vol. 7, published 1977 by Marshall Cavendish Limited, p. 946.
*The World Book Encyclopedia*, Copyright 1998, p. 678.

* cited by examiner

*Primary Examiner*—William P. Watkins, III
(74) *Attorney, Agent, or Firm*—Kelly K. Kordzik; Winstead Sechrest & Minick P.C.

(57) ABSTRACT

A perforated panel having a grid of perforations or holes formed at least partially therethrough for disposing hangers for holding objects thereon and having at least a black color pattern disposed on a surface thereof for camouflaging the perforations and for reducing the appearance of damage and/or stains occurring through use is provided. It is desired to have a base finish formed on the panel and a first color pattern and the black color pattern formed by spattering of paint on the panel, screen printing, or attaching a lamina having the first color pattern and the black color pattern thereon.

10 Claims, 3 Drawing Sheets

CAMOUFLAGED PERFORATED PANEL AND METHOD OF FORMING

This application is a non-provisional application claiming priority to provisional application No. 60/168,657 filed on Dec. 2, 1999.

TECHNICAL FIELD

The present invention relates to panels for supporting hangers for holding objects and more particularly to panels having perforations for supporting hangers which are camouflaged to disguise the nature of the panel.

BACKGROUND

Heretofore, perforated panels (peg boards) have been constructed of material such as particle board, reconstituted wood panel, hardboard, or a rigid paper board having a plurality of perforations formed at least partially through the panel in rows and columns. These perforations provide a means for placing hangers upon which objects such as tools and the like may be hung. These panels are unfinished and unattractive limiting their use primarily in work shops, garages and the like. Further, these panels typically become damaged from use and stained by material such as grease, oil, paint, and other material when objects are being hung or removed from the panel.

It would be a benefit, therefore, to have a perforated panel which camouflages the perforations to provide a more attractive appearing perforated panel applicable for use within public access areas such as in a home or retail store. It would be a further benefit to have a perforated panel which camouflages damage and stains which may result from the placing on or removal of objects from the perforated panel.

GENERAL DESCRIPTION

It is thus an object of the invention to provide a perforated panel which camouflages the perforations.

It is a still further object of the present invention to provide a perforated panel which camouflages stains and/or damage resulting through use of the panel.

Accordingly, a perforated panel having a grid of perforations or holes formed at least partially therethrough for disposing hangers for holding objects thereon and having at least a dark (e.g., black) pattern (e.g., a pigmented material created using paint or ink) thereon for camouflaging the perforations. The panel may have a first pattern of a first pigment and a black pigmented pattern formed thereon.

The perforated panel may be formed of any material such as, but not limited to, reconstituted wood panel, hardboard, rigid paper board or particle board which is capable of supporting hangers and objects which are desired to be stored on the hangers. A base finish, such as a matte finish may be applied to the surface of the panel upon which the objects will be disposed. The base finish may be applied by means of a brush, roller, or spray device. The base finish may consist of one or more colors.

A secondary finish, lighter and/or darker than the base finish, may be spattered onto the base finish. This secondary finish may consist of two or more colors, one of which is matte black so as to camouflage the perforations. The secondary finish may be applied and spattered on the base finish by hitting a flat side of the ferrule of the brush against the hand causing small specks of paint to release from the brush and adhere to the panel. By spattering the secondary finish in this manner from the proper distance, spots are produced in shape and size which aide in the hiding of the perforations.

Additionally, a camouflaged perforated panel of the present invention may be formed by creating a lamina which may be adhered to a panel constructed of a material capable of supporting objects. The panel and lamina are then perforated for disposing and holding of hangers. In this embodiment, the lamina may be constructed of material such as, but not limited to, paper, vinyl or other substantially flexible material. One method of creating the pattern and lamina is by means of offset lithography whereby the image is transferred from an inked plate to an intermediate surface, usually a rubber covered cylinder, that transfers the image onto the desired lamina. The pattern for the "camouflage" may be created in the same manner as described above, or may be computer generated, or hand drawn.

Another method of forming the panel of the present invention is via screen painting. A camouflage pattern is created by spattering each color of the random pattern onto an individual solid substrate. A screen printing stencil is then created photochemically on a fine mesh material such as, but not limited to, nylon, polyester, or metal. One stencil is created for each color pattern. Each screen may then be placed on a surface of the panel and the designated matte finish color is forced through the stencil. It is desired that the matte black finish be applied last. Once the camouflage pattern is applied the perforations or holes may be formed if not already formed by the panel.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
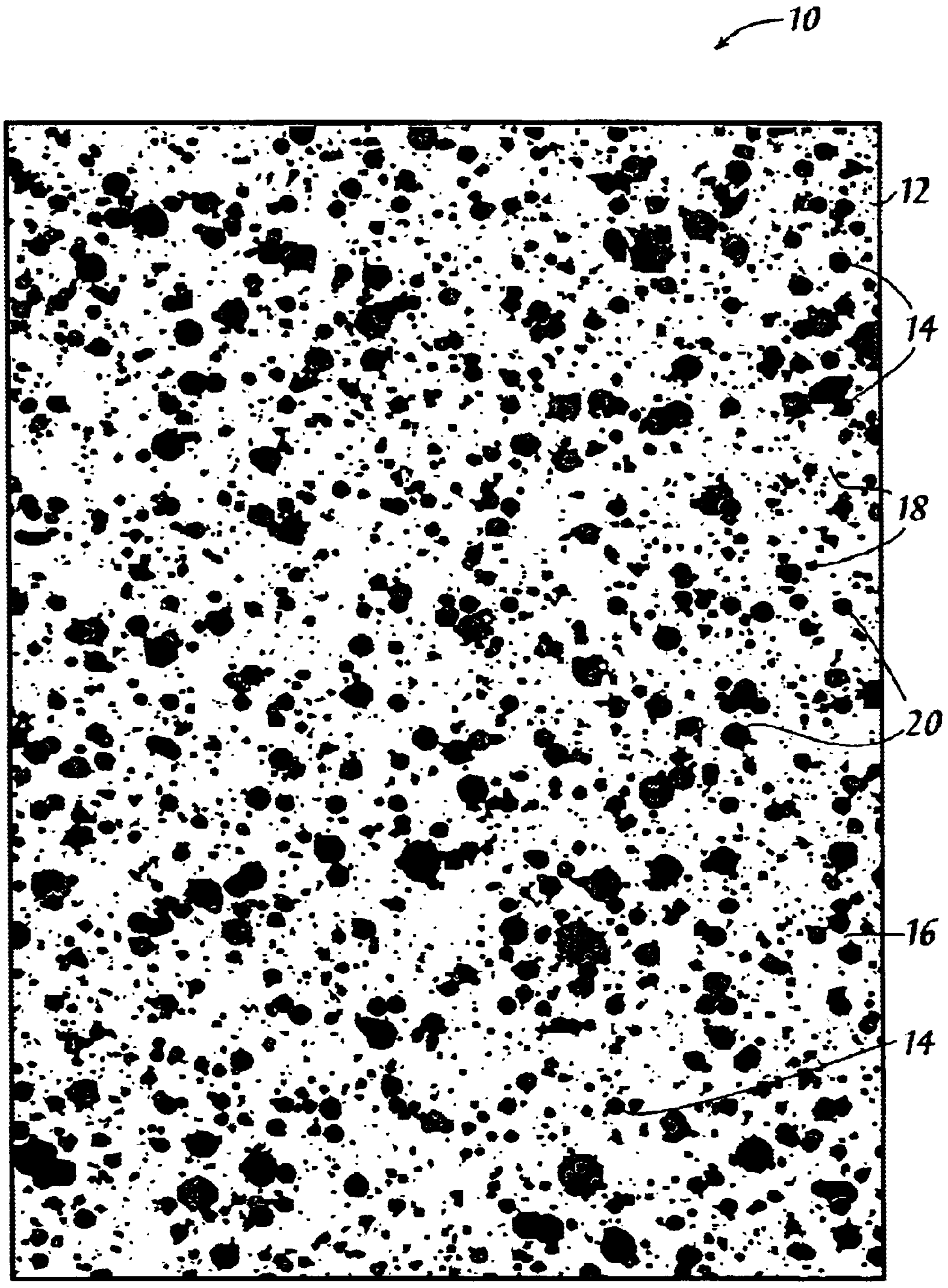
FIG. 1 is a plan view of the camouflaged perforated panel of the present invention.

FIG. 1 is a plan view of an exemplary embodiment of the camouflaged perforated panel of the present invention generally designated by the numeral 10. Camouflaged perforated panel 10 includes a panel 12, holes or perforations 14 formed at least partially through said panel 12, a base finish

16, spatter color 18, and black spattered finish 20. Perforations 14 may be formed in panel 12 before or after the camouflage is applied.

Figure 2:
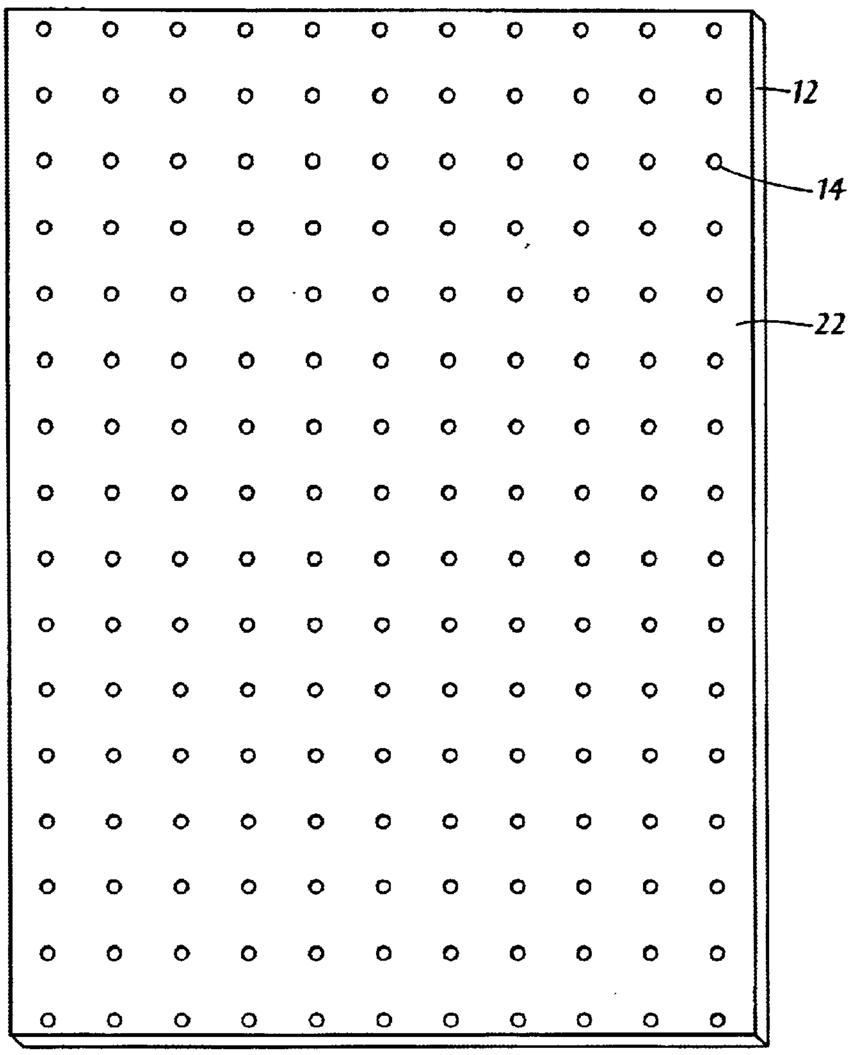
FIG. 2 is a perspective view of a panel having perforations.
Figure 3:
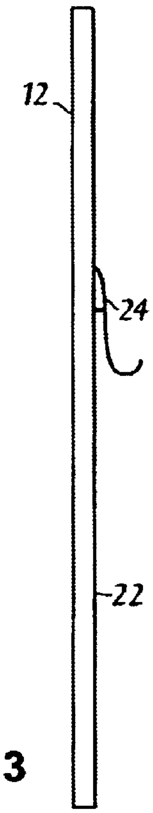
FIG. 3 is a side view of a panel having a hook attached thereto.

Panel 12 includes a plurality of perforations formed in a pattern for disposing hangers 24 (FIG. 3). In one embodiment, a base matte finish is applied to surface 22 (FIG. 2). Holes 14 are opened to surface 22. Base finish 16 may comprise one or more colors. Spatter coat 18 is applied atop base finish 16 in a manner such as to form substantially circular spots on panel 12. Spatter coat 18 includes one or more colors of a matte or flat finish. A final application of black spatter 20 is applied. Black spatter 20 is a black matte paint, or some other pigmented medium, such as ink.

FIG. 2 is a perspective view of a panel 12 having perforations 14 formed through a surface 22 at least a portion of panel 12. As shown in FIG. 2, panel 12 may be constructed of any material capable of supporting objects and adapted for incorporation in a structure or attachment such as to a wall or other braced members of a home or store. As shown, panel 12 may be a typical construction of reconstituted hardboard or particle board having pre-drilled perforations 14. Although, application of the present invention may be utilized with panels 12 which do not have pre-drilled holes 14, incorporating drilling holes 14 before or after the application of base finish 16, and spatter colors 18 and 20.

With reference to FIGS. 1 through 3, holes 14 are positioned in a pattern so as to allow for the placement and attachment of hangers 24 which may be formed in many configurations. Hangers 24 are positioned within holes 14 for the purpose of holding objects (not shown) such as hand tools and products for display or storage.

Figure 4:
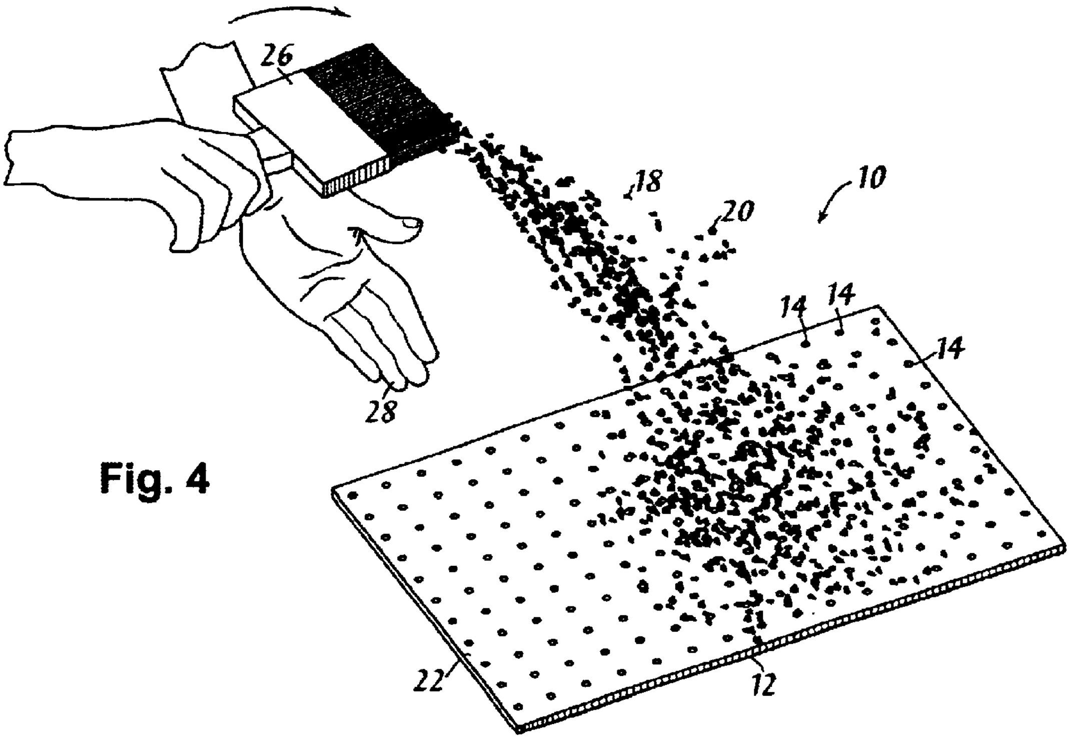
FIG. 4 is an illustration of a method of spattering paint on a panel.

FIG. 4 illustrates a method of spattering paint 18 and/or 20. As shown, paint 18 and/or 20 is applied to a brush 26. Brush 26 may be impacted against a hand 28 of a user so as to transport paint from brush 26 onto surface 22 of panel 12 in a manner forming a random pattern of spattered paint which aide in camouflaging holes 14. In addition, spatter 18 and/or 20 aide in camouflaging stains or damage incurred by panel 12 in use.

With reference to FIGS. 1 through 4, a method of forming a camouflaged perforated panel 10 of the present invention is disclosed. A first coat of paint is applied to surface 22 of panel 12 which has open holes 14 or through which holes 14 will be formed. It is desired that the first coat of paint be a matte (flat) finish. The base finish 16 may be created with one or more colors. A spatter pattern 18 is applied atop base finish 16 with a flat finish. Spatter pattern 18 may include more than one color applied in combination or in steps, the colors being lighter or darker than base finish 16. Spatter pattern 18 is formed by applying paint to a bristle brush 26 and contacting a portion of brush 26 against a user's hand 28 in a manner such that paint is released from brush 26 and is deposited on panel 12. One method of spattering the paint is by hitting the flat side of the ferrule of brush 26 against the heel of the thumb of hand 28 causing specks of the paint to release and fly from brush 26 onto panel surface 22 in a random pattern. It is desirable for panel 12 to be in a horizontal position when spatter patterns are being applied. A final flat (matte) black spatter pattern 20 is applied in the same manner as described above after the first spatter 18 application is allowed to dry.

Another method of forming a camouflaged perforated panel 10 of the present invention is by forming a camouflage pattern lamina to be applied to panel 12 and perforations 14 formed through the lamina and panel 12. The lamina is created by offset lithography. Spatter pattern 18 and 20 are created as described above on a solid substrate and transferred to printing plates by a photochemical process. There is generally one color per plate, and the black (dark) plate is printed with a matte finish. The pattern 18 and 20 is then transferred from an inked plate to an intermediate surface, usually a rubber cylinder, that transfers the camouflaged pattern onto the desired lamina. The lamina may be a material such as but not limited to paper, vinyl, or some other thin, substantially flexible material depending on the desired final product. The lamina may have a base tint 16. The lamina may then be applied to panel 12 in any suitable manner and perforations 14 are formed through the lamina and into panel 12. This method of construction provides for mass production of camouflaged perforated panel 10.

Another method of constructing the camouflaged perforated panel 10 of the present invention is by screen printing. The spatter pattern 18 and 20 is created by spattering each of the desired colors of the random pattern onto a solid substrate as described above. A screen printing stencil is then developed photochemically from this pattern on a strong fine mesh material such as but not limited to nylon, polyester or metal. One stencil is created for each color pattern. Each screen may then be placed on the surface of a panel 12 to which base finish 16 has been applied and a matte finish color is forced through the stencil. The step is repeated for each color desired to be applied with the last step being the application of the black matte pattern 20. Once patterns 18 and 20 are applied, holes 14 may be formed if not already formed in panel 12.

Although the present invention and its advantages have been described in detail, it should be understood that various changes, substitutions and alterations can be made herein, without departing from the spirit and scope of the invention as defined by the appended claims.

What is claimed is:

1. A camouflaged perforated panel for hanging objects from, said panel comprising:

a panel having a first surface through which holes are formed; and a first pattern of at least one colored pigment suspended in a medium applied atop said first surface through which said holes are formed, wherein said colored pigment is black and wherein said pattern includes a plurality of substantially circular dots of diameters near a diameter of said holes, wherein said first pattern camouflages said holes such that said holes are hidden from the view of an observer when the panel is positioned substantially in a vertical orientation for the mounting of hooks to hang said objects.

2. The perforated panel of claim 1 further comprising:

a second pattern of black pigment suspended in a medium applied atop said first surface.

3. The perforated panel of claim 1, further comprising:

a base finish applied to said first surface upon which said first pattern is applied.

4. The perforated panel of claim 3, wherein said base finish, and said first pattern are formed by a flat paint.

5. The perforated panel of claim 2, wherein said first and said second patterns of pigment suspended in a medium are spattered on said first surface.

6. The perforated panel of claim 1, further comprising hooks for mounting on said camouflaged perforated panel when it is positioned substantially in a vertical orientation, wherein said hooks are adaptable for hanging objects therefrom.

7. The perforated panel of claim 1, wherein said first pattern is formed on a lamina attached to said first surface, and said holes are formed through said lamina and at least partially through said panel.

8. The perforated panel of claim 1, wherein said first pattern is random.

9. A camouflaged perforated panel for hanging objects from, said panel comprising:

panel having a first surface through which holes are formed; and a first pattern of at least one colored pigment suspended in a medium applied atop said first surface through which said holes are formed, wherein said colored pigment is of a dark color and wherein said pattern includes a plurality of substantially circular dots of diameters near a diameter of said holes, wherein said first pattern camouflages said holes such that said holes are hidden from the view of an observer when the panel is positioned substantially in a vertical orientation for the mounting of hooks to hang said objects.

10. A camouflaged perforated panel for hanging objects from, said panel comprising:

a panel having a first surface through which holes are formed; and a first pattern of at least one colored pigment suspended in a medium applied atop said first surface through which said holes are formed, wherein said pattern includes a plurality of substantially circular dots of diameters near a diameter of said holes, wherein said first pattern camouflages said holes such that said holes are hidden from the view of an observer when the panel is positioned substantially in a vertical orientation for the mounting of hooks to hang said objects.

* * * * *